(12) United States Patent
Eissing et al.

(10) Patent No.: US 12,521,795 B2
(45) Date of Patent: Jan. 13, 2026

(54) HEAT-AWARE TOOLPATH REORDERING FOR 3D PRINTING OF PHYSICAL PARTS

(71) Applicant: Siemens Industry Software Inc., Plano, TX (US)

(72) Inventors: Katharina Eissing, Papenburg (DE); Omar Fergani, Berlin (DE); Frank Heinrichsdorff, Teltow (DE); Darya Kastsian, Falkensee (DE); Daniel Reznik, Berlin (DE)

(73) Assignee: Siemens Industry Software Inc., Plano, TX (US)

( * ) Notice: Subject to any disclaimer, the term of this patent is extended or adjusted under 35 U.S.C. 154(b) by 482 days.

(21) Appl. No.: 18/001,358

(22) PCT Filed: Jun. 19, 2020

(86) PCT No.: PCT/US2020/038725
§ 371 (c)(1),
(2) Date: Dec. 9, 2022

(87) PCT Pub. No.: WO2021/257093
PCT Pub. Date: Dec. 23, 2021

(65) Prior Publication Data
US 2023/0234136 A1 Jul. 27, 2023

(51) Int. Cl.
*B22F 10/85* (2021.01)
*B22F 10/366* (2021.01)
(Continued)

(52) U.S. Cl.
CPC ............ *B22F 10/85* (2021.01); *B22F 10/366* (2021.01); *B22F 12/44* (2021.01); *B22F 12/47* (2021.01); *B33Y 50/02* (2014.12)

(58) Field of Classification Search
CPC ........ B22F 10/85; B22F 10/366; B22F 12/44; B22F 12/47; B22F 10/20; B22F 10/385;
(Continued)

(56) References Cited

U.S. PATENT DOCUMENTS 5,561,601 A * 10/1996 Inoue ................. G05B 19/4069
700/182
2015/0151491 A1 6/2015 Teulet
(Continued)

FOREIGN PATENT DOCUMENTS

CN 108292325 A 7/2018
CN 108326301 A 7/2018
(Continued)

OTHER PUBLICATIONS

Ganganath Nuwan et al: "Trajectory planning for 3D printing: A revisit to traveling salesman problem", 2016 2nd International Conference on Control, Automation and Robotics (ICCAR), IEEE, Apr. 28, 2016 (Apr. 28, 2016), pp. 287-290, 4 pages.
(Continued)

*Primary Examiner* — Michael J Brown

(57) ABSTRACT

A computing system may include an access engine and a toolpath reordering engine. The access engine may be configured to access an original layer toolpath for slice of a 3D CAD object as well as a heat criticality measure for the original layer toolpath. The heat criticality measure may specify a heat impact for different points on the multiple toolpath segments of the original layer toolpath for the 3D printing of the physical part using the original layer toolpath. The toolpath reordering engine may be configured to reorder the multiple toolpath segments into a modified layer toolpath, and the modified layer toolpath may have a heat
(Continued)

criticality measure with a lesser heat impact on the physical part than the heat criticality measure for the original layer toolpath.

20 Claims, 7 Drawing Sheets

(51) Int. Cl.
*B22F 12/44* (2021.01)
*B22F 12/47* (2021.01)
*B33Y 50/02* (2015.01)
*G06F 30/27* (2020.01)

(58) Field of Classification Search
CPC ......... B22F 10/80; B33Y 50/02; B33Y 50/00; G05B 2219/35134; G05B 2219/49007; G05B 2219/49008; G05B 2219/49023; G05B 19/4099; Y02P 10/25; Y02P 90/02; B29C 64/393; G06F 2113/10; G06F 30/27
USPC .......................................................... 700/98
See application file for complete search history.

(56) References Cited

U.S. PATENT DOCUMENTS

| | | | |
|---|---|---|---|
| 2015/0375344 A1* | 12/2015 | Adcock | B29C 70/745 219/76.1 |
| 2019/0001656 A1* | 1/2019 | Susnjara | B33Y 40/00 |
| 2019/0009472 A1* | 1/2019 | Mark | B29C 64/393 |
| 2019/0391562 A1 | 12/2019 | Srivastava et al. | |
| 2020/0114422 A1 | 4/2020 | Mark et al. | |
| 2020/0156323 A1* | 5/2020 | Woytowitz | B33Y 50/02 |
| 2021/0053293 A1* | 2/2021 | MacNeish, III | B29C 64/118 |
| 2021/0129226 A1 | 5/2021 | Ploshikhin | |
| 2022/0075346 A1 | 3/2022 | Pieper et al. | |
| 2024/0033820 A1 | 2/2024 | Lower et al. | |

FOREIGN PATENT DOCUMENTS

| | | |
|---|---|---|
| CN | 108995220 A | 12/2018 |
| CN | 109843551 A | 6/2019 |
| CN | 110126279 A | 8/2019 |
| CN | 110168546 A | 8/2019 |
| DE | 10042134 | 3/2002 |
| EP | 1441897 A1 | 8/2004 |
| WO | 2015062564 A1 | 5/2015 |
| WO | 2019099547 A2 | 5/2019 |

OTHER PUBLICATIONS

Abdullah H et al: "Tool path length optimisation of contour parallel milling based on modified ant colony optimisation", The International Journal of Advanced Manufacturing Technology, Springer, London, vol. 92, No. 1, Mar. 10, 2017 (Mar. 10, 2017) , pp. 1263-1276, 14 pages.
J.P. Kruth et al: Selective laser melting of iron-based powder11 , Journal of Materials Processing Technology, vol. 149, No. 1, Jan. 1, 2004 (Jan. 1, 2004), pp. 616-622, 8 pages.
PCT Search Report dated Feb. 17, 2021, for PCT Application No. PCT/US2020/038725, 15 pages.
Zhai Xiaoya et al: "3D Printing Path Planning of Fractal Models", Journal of Computer-Aided Design & Computer Graphics, vol. 30 No. 6 , p. 152-164, DOI: 10.3724/SP.J.1089.2018.16618 , Jun. 2018.
Michel Florent et al: A modular path planning solution for Wire + Arc Additive Manufacturing, Robotics and Computer Integrated Manufacturing., vol. 60, Dec. 1, 2019 (Dec. 1, 2019), pp. 1-11, 12 pages.
Ren K et al: "Thermal analyses for optimal scanning pattern evaluation in laser aided additive manufacturing", Journal of Materials Processing Technology, vol. 271, Mar. 22, 2019 (Mar. 22, 2019), pp. 178-188, 12 pages.
Trenke D: 11 Techni sches Upgrade der Rapid Tooling Anlage Eosint M 25011 , Jan. 1, 2002 (Jan. 1, 2002), 6 pages.
J.P. Kruth et al: "Selective laser melting of iron-based powder", Journal of Materials Processing Technology, vol. 149. No. 1. Jan. 1, 2004 (Jan. 1, 2004), pp. 616-622, 8 pages.
Mathias Laustsen Jensen, "Toolpath Strategies for 5DOF and 6DOF Extrusion-Based Additive Manufacturing", Applied Sciences, 2019, 9, 4168; doi:10.3390/app9194168, 9 pages.

* cited by examiner

HEAT-AWARE TOOLPATH REORDERING FOR 3D PRINTING OF PHYSICAL PARTS

BACKGROUND

Computer systems can be used to create, use, and manage data for products and other items. Computer-aided technology (CAx) systems, for instance, may be used to aid in the design, analysis, simulation, or manufacture of products. Examples of CAx systems include computer-aided design (CAD) systems, computer-aided engineering (CAE) systems, visualization and computer-aided manufacturing (CAM) systems, product data management (PDM) systems, product lifecycle management (PLM) systems, and more. These CAx systems may include components (e.g., CAx applications) that facilitate design and simulated testing of product structures and product manufacturing.

BRIEF DESCRIPTION OF THE DRAWINGS

Certain examples are described in the following detailed description and in reference to the drawings.

DETAILED DESCRIPTION

Figure 1:
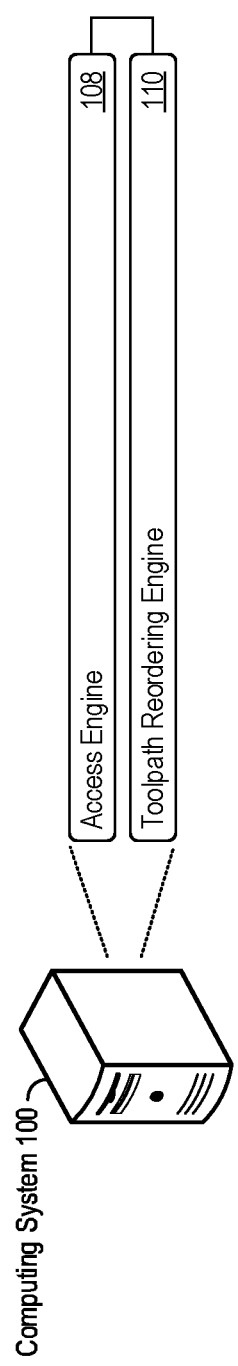
FIG. 1 shows an example of a computing system that supports heat-aware toolpath reordering for 3-dimensional (3D) printing of physical parts.

Additive manufacturing (sometimes referred to as 3-dimensional or 3D printing) may be performed via 3D printers that can construct objects on a layer-by-layer basis. Example forms of additive manufacturing include multi-axis 3D printing, in which 3D printers can adjust (e.g., tilt) an axis along which 3D construction is performed through material deposition, and laser powder bed fusion processes, in which a laser can be used as a power source to sinter/melt powdered material (e.g., metal powder) laid up on a powder bed or build platform. 3D printing may involve successively forming material in an incremental manner through use of 3D printing tools, such as through a material deposition head or an energy beam that is used to incrementally build a 3D part in an ordered manner. As used herein, a toolpath may refer to any course, route, or pathing that is used by a 3D printer to construct any portion of a 3D part through additive manufacturing, whether as a path to successively deposit material for material deposition 3D printing technologies, as a path to guide a laser (or other energy emission) for energy application through LPBF-type 3D printing technologies, and more.

One challenge faced by modern 3D printing systems is handling heat generation caused by 3D printing processes. For instance, multi-axis 3D printing technologies may require sufficient heating of 3D printing materials into a malleable form (e.g., metal beads), and such heat may be amplified when using metal or other base plates that can accumulate, retain, and emit heat. Energy applications through LBPF lasers to sinter metal powder may likewise use and inject heat into a 3D printing environment as part of the 3D printing process. Excess heat may adversely impact 3D part construction, for example by causing part warping in heat hotspots, inaccurate part constructions, part failures, insufficient material quality, and aborted print jobs due to damage of recoating systems. Many current toolpath generation algorithms for 3D printing are optimized for 3D printing speed, without accounting for heat generation, and may thus be faced with increased part deformations, lower printing yields, or reduced printing efficiency. Simplistic solutions to pause a 3D printing processes during part construction may attempt to address heat-related part problems, but at a cost of increased 3D part construction times (also referred to as build times) and reduced efficiency.

The disclosure herein may provide systems, methods, devices, and logic for heat-aware reordering of toolpaths for 3D printing of physical parts. As described in greater detail herein, various heat-aware toolpath reordering features may support the reordering of 3D printing toolpaths to reduce the impact of heat-based problems in 3D parts. As described herein, toolpaths may be reordered and optimized to account for heat criticality measures and reduce heat impacts on 3D part construction. Reordering may be performed through use of path optimization algorithms or machine-learning models, leveraging input heat analyses and criticality measures on a point-wise or segment-wise basis. Accordingly, the heat-aware toolpath reordering features described herein may decrease heat impact of conventionally-generated toolpaths while also reducing build times to optimize 3D part construction.

These and other heat-aware toolpath reordering features and technical benefits are described in greater detail herein.

FIG. 1 shows an example of a computing system 100 that supports generation of heat-aware toolpath reordering for 3D printing of physical parts. The computing system 100 may take the form of a single or multiple computing devices such as application servers, compute nodes, desktop or laptop computers, smart phones or other mobile devices, tablet devices, embedded controllers, and more. In some implementations, the computing system 100 implements a CAx tool, application, or program to aid users in the design, analysis, simulation, or 3D manufacture of products, including heat-aware toolpath reordering.

As an example implementation to support any combination of the heat-aware toolpath reordering features described herein, the computing system 100 shown in FIG. 1 includes an access engine 108 and a toolpath reordering engine 110. The computing system 100 may implement the engines 108 and 110 (including components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engines using the same computing system features or hardware components (e.g., a common processor or a common storage medium).

In operation, the access engine 108 may access an original layer toolpath for slice of a 3D CAD object. As used herein, a CAD object (including 3D CAD objects) may include any type of CAx object data relevant to part design, simulation, analysis, or manufacture. A CAD object may thus include 3D object designs, models, model slices, toolpaths, and more. The 3D CAD object may represent a physical part, the slice may represent a physical layer for 3D printing of the physical part, and the original layer toolpath may control the 3D printing of the physical layer and include a 3D print order for multiple toolpath segments of the original layer toolpath. The original toolpath may refer to any 3D printing toolpath accessed prior to application of or used as an input to the heat-aware toolpath reordering features described herein. In operation, the access engine 108 may also access a heat criticality measure for the original layer toolpath. The heat criticality measure may specify a heat impact for different points on the multiple toolpath segments of the original layer toolpath for the 3D printing of the physical part using the original layer tool path.

In operation, the toolpath reordering engine 110 may reorder the multiple toolpath segments of the original layer toolpath into a modified layer toolpath. The modified layer toolpath may have a different 3D print order from the original layer toolpath and a heat criticality measure with a lesser heat impact on the physical part than the heat criticality measure for the original layer toolpath. The toolpath reordering engine 110 may further provide the modified layer toolpath to support the 3D printing of the physical part.

These and other heat-aware toolpath reordering features are described in greater detail next.

Figure 2:
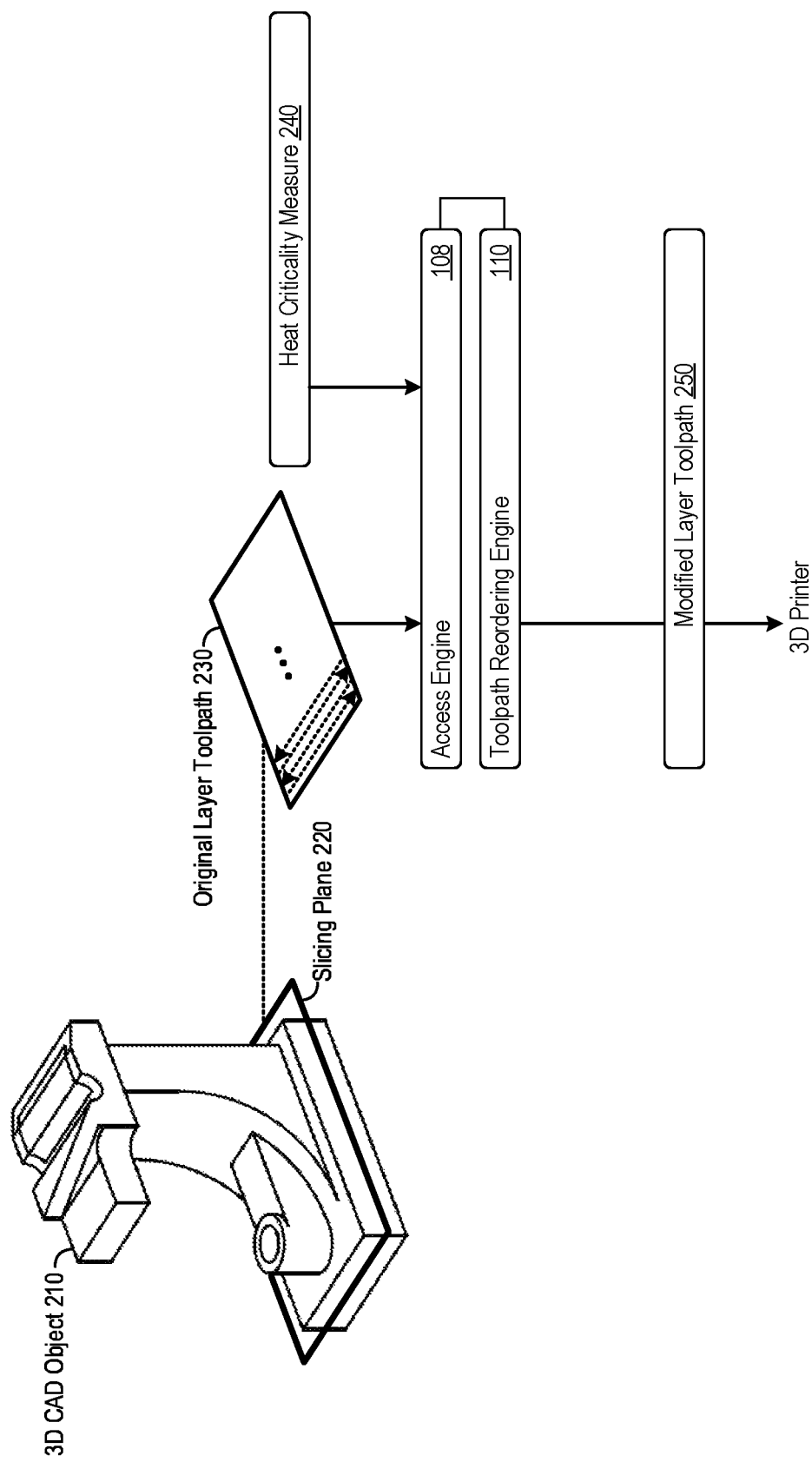
FIG. 2 shows an example heat-aware toolpath reordering of an original layer toolpath into a modified layer toolpath.

FIG. 2 shows an example heat-aware toolpath reordering of an original layer toolpath into a modified layer toolpath. The example in FIG. 2 is illustrated via a computing system that implements an access engine 108 and a toolpath reordering engine 110. However, various other implementations are contemplated herein.

The access engine 108 may access any CAx data relevant to generation, reordering, analysis, or processing of 3D printing toolpaths. The heat-aware toolpath reordering features described herein may result in heat-aware toolpaths. As used herein, a heat-aware toolpath may refer to any toolpath that accounts for heat impact in the 3D printing of physical parts, including modified toolpaths described herein that have been reordered from conventionally generated non-heat-aware or any other input or original toolpaths. In some implementations, heat-aware toolpath reordering is performed on a per-layer basis. In such examples, the access engine 108 may access any number of slices of a 3D CAD object to support heat-aware toolpath reordering.

The access engine 108 may access layer toolpaths for various slices of a 3D CAD object 210, and the slices may be generated through a slicing plane 220 that intersects the CAD object 210 along any build-axis supported for the 3D printing of a physical part represented by the 3D CAD object 210. In FIG. 2, the access engine 108 accesses the original layer toolpath 230, which may represent a toolpath for the physical manufacture of a given slice of the 3D CAD object 210. In some implementations, the access engine 108 may itself perform intersection operations on the 3D CAD object 210 to obtain part slices and generate original layer toolpaths for the part slices. In other examples, the access engine 108 may otherwise obtain original layer toolpaths for slices of the 3D CAD object 210 generated by other pathing logic (e.g., conventional layer toolpath generation tools).

Original layer toolpaths may refer to any initial, predetermined, or non-heat-aware toolpath generated for an 3D CAD object slice. As such, original layer toolpaths may take the form of any conventionally generated toolpath that does not account for heat in its route (referred to herein as non-heat-aware toolpaths). Examples of conventionally generated toolpaths include toolpaths optimized for 3D printing speed, such as continuous line-scan material deposition routes, conventional laser hatch trackings, or path vectors generated by conventional 3D printing systems. Conventionally generated toolpaths may also include topology-dependent local tool parameters (e.g. laser power, write speed), adopted to topology-dependent requirements (e.g. overhang strategies and more).

As described herein, toolpaths (including layer toolpaths) may include toolpath segments. A toolpath segment may be any sub-section of a toolpath, and may be in the form of hatch vectors (thus with a starting point and an end point). In that regard, the combination of the toolpath segments of a given toolpath may form an ordered path that a 3D printer traverses to print a portion of the 3D part, such as a physical layer of the 3D part.

The access engine 108 may support the capability to analyze toolpaths of any type, including original layer toolpaths and modified layer toolpaths as described herein. In particular, the access engine 108 may access a heat criticality measure 240 for the original layer toolpath 230. A heat criticality measure may include any analysis, measure, data, statistic, or other assessment that specifies a heat impact on the 3D printing of a physical part using a given toolpath. In some implementations, the access engine 108 may itself compute heat criticality measures for layer toolpaths. In other implementations, the access engine 108 may access computed heat criticality measures from separate analysis logic configured to process layer toolpaths and generate heat criticality measures.

Various forms of heat criticality measures are contemplated herein, including according to any of the heat analyses, processes, implementations or features described in International Patent Application No. PCT/EP2019/085918, filed on Dec. 18, 2019, with inventors Daniel Reznik, Frank Heinrichsdorff, Darya Kastsian, and Katharina Eissing, which is hereby incorporated by reference herein in its entirety.

For instance, an accessed heat criticality measure may specify heat impacts for a particular toolpath on a point-wise basis, and a point may be delineated as any partition, delineation, or other sub-section of the particular toolpath or the toolpath segments (e.g., vectors) that comprise the particular toolpath. To illustrate through a layer toolpath in the form of hatch vectors generated for slices in a laser bed powder fusion (LBPF) 3D printing process, a heat criticality measure may specify a point-wise heat criticality for multiple points on each of the hatch vectors. The heat criticality measure may utilize an integral that calculates the mass below and in a neighborhood (e.g., a objectively determined surrounding region) of a given point and an amount of energy applied to the given point as well as the history of a predetermined number of points 3D before and/or after the given point in the ordered hatch vectors.

In some examples, heat criticality measures generated or otherwise accessed by the access engine 108 may specify a gradient by which a particular point, multiple points in a certain objectively-measured vicinity, toolpath segment, another sub-portion of a layer toolpath, or the entire layer toolpath exceeds a critical temperature for 3D printing of a physical part. Such a critical temperature may be determined experimentally for a given build environment, and may vary depending on 3D part materials (e.g., deposition beads, metal powders, or other construction materials), 3D printing process parameters, build environment temperatures, 3D printer properties, and more. The critical temperature may refer to a threshold temperature at which 3D part will burn, oxidize, deform, or otherwise be adversely impacted to alter the quality or design of a 3D printed part. For instance, the critical temperature may take the form of a threshold temperature at a melt pool in the moment of creation exceeds a critical size for LBPF-type or other 3D printing technologies. The access engine 108 or other entity may configure a value for a critical temperature in the determination of heat criticality measures for toolpaths.

In some examples, heat criticality measures may take the form of gradient value with respect to a critical temperature. For instance, the heat criticality measure 240 in FIG. 2 may specify (e.g., on a point-wise basis) a degree/amount to which temperatures of the 3D part for each of the different points on the multiple toolpath segments of the original layer toolpath 230 exceed (or fall below) a critical temperature for the 3D printing of the physical part. In computing heat criticality measures, the access engine 108 (or other analysis logic) may utilize a combination of finite element analysis (FEA), machine-learning (ML), or other processing techniques to compute a build temperature for the various points in a given toolpath, and determine the degree to which the computed build temperatures differ from a critical temperature for the 3D printing. The access engine 108 may do so, for example, in any of the ways described in International Patent Application No. PCT/EP2019/085918. Gradients (e.g., an amount/degree of temperature difference) may be measured objectively as a difference in the computed build temperatures for each point of a given toolpath and corresponding critical temperature(s).

FEA analysis over the entire toolpath to construct a 3D printed part may be impractical or unfeasible. In some instances, entire 3D part toolpaths may exceed tens or hundreds of miles in length, and FEA computations may require days, weeks, or even years of computation time, depending on capability and availability of relevant computing resources. The access engine 108 may utilize machine-learning models to improve the speed and efficiency of heat criticality measure computations, e.g., by training a machine-learning model with detailed FEA input data for representative (e.g., small or selected) portions of a layer toolpath. Such representative portions may be provided for training with respect to consistent 3D printing parameters, and may include representative FEA data for hatch vectors or other toolpath segments of varying length and position sampled from the overall 3D part toolpath, and, in some implementations, hypothetical representative volume elements with reordered vectors may be used as training data as well. Through such training, machine-learning models utilized by the access engine 108 may support computation and determination of heat criticality measures with increased speed and efficiency.

Accordingly, accessed heat criticality measures may identify points in a toolpath (and corresponding portions of a manufactured 3D part) that may exceed critical temperatures and thus cause part deformations and/or other problems caused by local overheating.

To address 3D part overheating that may occur for a given layer toolpath, the toolpath reordering engine 110 may generate a modified layer toolpath with a reduced heat impact as compared to the given layer toolpath (which may thus result in increased part quality). In the example shown in FIG. 2, the toolpath reordering engine 110 may reorder the 3D print order of the toolpath segments in the original layer toolpath 230 to obtain a modified layer toolpath 250. The modified layer toolpath may have a reduced heat impact as compared to the original layer toolpath 230, and the reduced heat impact may be determined by the toolpath reordering engine 110 through a comparison between the heat criticality measure for the modified layer toolpath 250 and the heat criticality measure 240 of the original layer toolpath 230.

To construct the modified layer toolpath 250, the toolpath reordering engine 110 may apply any number of optimization techniques to reorder toolpath segments to satisfy any number of pre-defined objectives, for example as defined through a configured objective function. Example objectives that may be accounted for by the toolpath reordering engine 110 include to minimize toolpath build time (which can be measured for a given toolpath as a function of the length (also referred to as distance) of the layer toolpath, which can include active printing distances through toolpath segments and travel distances and delays/pauses for a 3D printer between successive toolpath segments), threshold reductions or upper limits in heat criticality measures, and more. Constraints and objectives applied by the toolpath reordering engine 110 in determining the modified layer toolpath 250 may be interdependent, for instance to optimize 3D print order of the toolpath segments of the original layer toolpath 230 such that the build time of the modified layer toolpath 250 is minimized subject to a constraint that the heat criticality measure of the modified layer toolpath 250 is reduced at least lower than a threshold heat criticality measure.

In some implementations, the toolpath reordering engine 110 may reorder the multiple toolpath segments of the original layer toolpath 230 into the modified layer toolpath 250 by iteratively optimizing candidate layer toolpaths using a path optimization algorithm applied to optimize the heat criticality measure and overall build time of the candidate layer toolpaths in order to determine the modified layer toolpath 250. The modified layer toolpath 250 may have a lesser heat impact on the physical part than the original layer toolpath 230, and the toolpath reordering engine 110 may objectively compare heat impacts between layer toolpaths in various ways.

As an illustrative example, the toolpath reordering engine 110 may numerically compare a total amount by which points in the original layer toolpath 230 and the modified layer toolpath 250 exceed the critical temperature for 3D printing of the physical part represented by the 3D CAD object 210. As another example, the toolpath reordering engine 110 may compare a maximum point-wise gradient exceeding the critical temperature in the original layer toolpath 230 and the modified layer toolpath 250, and determine a reduced heat measure for the modified layer toolpath 250 accordingly.

As yet another example, the toolpath reordering engine 110 may measure heat criticality measures on a per-toolpath segment base (e.g., vector-based heat criticality measures), which may be referred to herein as segment heat criticality measures. The toolpath reordering engine 110 may determine segment heat criticality measures by, for example, averaging the point-wise criticality over a toolpath segment (e.g., per hatch vector), defining an intervention threshold by a number of high criticality points in a given toolpath segment (e.g., wherein high criticality is measured by point-wise build temperatures exceeding a critical temperature by at least a criticality threshold, such as by more than 10° C.), by defining the criticality of a toolpath segment by an average over the neighboring sample points, and more. Such per-toolpath segment heat criticality measures may be used by the toolpath reordering engine 110 as yet another measure to compare heat impact between the original layer toolpath 230 and the modified layer toolpath 250, or to optimize the heat criticality measure of the modified layer toolpath 250 via segment reordering.

The toolpath reordering engine 110 may provide a modified layer toolpath to support the 3D printing of a physical part represented by a 3D CAD object. For instance, the toolpath reordering engine 110 may transmit the modified layer toolpath 250 as control data to a 3D printer, such that a deposition tool, laser or other energy source, or other 3D printing instrument traverses the modified layer toolpath 250 to physically manufacture a physical layer of a slice of 3D part represented by 3D CAD object 210. In some implementations, the toolpath reordering engine 110 is implemented locally as part of a 3D printer itself, so heat-aware toolpath reordering can occur on a same physical machine or computing environment as the 3D printing of the physical part. In other implementations, the toolpath reordering engine 110 may be implemented remotely from a 3D printer (e.g., by a remote CAD system or in a cloud computing environment) and the modified layer toolpath 250 may be transmitted across a communication network to the 3D printer.

Accordingly, original toolpaths (e.g., conventionally generated toolpaths) may be reordered into modified layer toolpaths via various heat-aware toolpath reordering features described herein. Physical parts constructed through use of a modified layer toolpath (as compared to an original layer toolpath) may have reduced heat impact and increased part quality. As such, the heat-aware toolpath reordering features described herein may improve the quality of 3D part construction using 3D printing, and may do so while reducing, minimizing, or otherwise optimizing build times to control, balance, and account for both build efficiency and part quality. Some examples of reordering techniques that the toolpath reordering engine 110 may apply are described next with reference to FIGS. 3-5.

Figure 3:
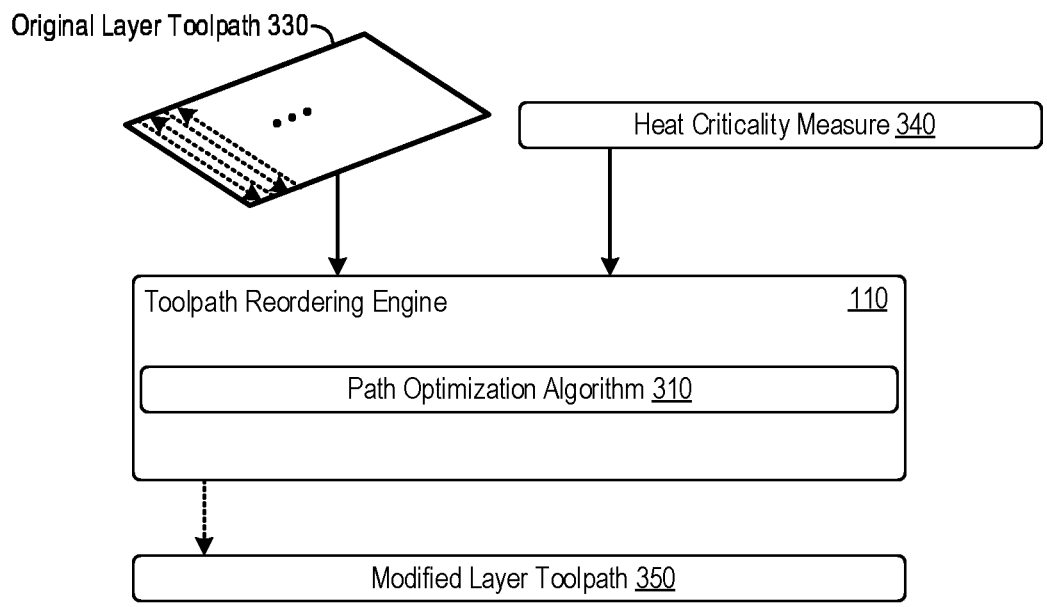
FIG. 3 shows an example of heat-aware toolpath reordering by a toolpath reordering engine using a path optimization algorithm.

FIG. 3 shows an example of heat-aware toolpath reordering by the toolpath reordering engine 110 using a path optimization algorithm. In the example shown in FIG. 3, the toolpath reordering engine 110 implements a path optimization algorithm 310, which may be any optimization algorithm the toolpath reordering engine 110 may apply to reorder toolpath segments of an input toolpath. For instance, the toolpath reordering engine 110 may take, as inputs, an original layer toolpath 330 and a heat criticality measure 340 for the original layer toolpath 330 (each of which may be respectively consistent with the original layer toolpath 230 and the heat criticality measure 240 described in FIG. 2). The toolpath reordering engine 110 may apply the path optimization algorithm 310 to the original layer toolpath 330 and heat criticality measure 340 and determine the modified layer toolpath 350 with a reduced heat impact as compared to the original layer toolpath 330.

Application of the path optimization algorithm 310 may be iterative such that candidate layer toolpaths are generated and evaluated until a set of algorithm constraints are satisfied. As noted herein, algorithm constraints may be specified, as an example, in terms of minimizing build time subject to threshold heat criticality measures. For a given iteration in application of the path optimization algorithm 310, the toolpath reordering engine 110 may access, as a candidate layer toolpath, an output layer toolpath determined from a prior iteration of the path optimization algorithm 310. For an initial iteration of the path optimization algorithm 310, the toolpath reordering engine 110 may identify the original layer toolpath 330 as the first candidate layer tool path.

Each candidate layer toolpath may include a particular 3D print order of the multiple toolpath segments (e.g., the same toolpath segments of original layer toolpath 330 but ordered differently) as well as a corresponding heat criticality measure. The heat criticality measure of each candidate layer toolpath may provide, in effect, an evaluation of the candidate layer toolpath, and the toolpath reordering engine 110 may iterate over various candidate layer toolpaths through the path optimization algorithm 310 to optimize layer toolpaths to satisfy the algorithm constraints and determine an optimal toolpath to output as a modified layer toolpath. After converging on an optimal toolpath (as evaluated via the algorithm constraints, e.g., of minimal build time and threshold heat criticality measure), the toolpath reordering engine 110 may identify and produce the modified layer toolpath 350. In some instances in which the number of toolpath segments in an original layer segments is relatively large (e.g., above a threshold number, such as 150, 2,000, or any other configurable threshold), the toolpath reordering engine 110 may divide a layer into a set of regions/sublayers (e.g., assigning the toolpath segments of the layer into the different regions/sublayers). In this case, the toolpath reordering engine 110 may determine modified toolpaths for each of the regions/sublayers, and generate a modified layer toolpath 350 as a combination of the modified toolpaths determined for each of the regions/sublayers of a given layer.

In some examples, the toolpath reordering engine 110 may apply, as the path optimization algorithm 310, an ant colony optimization algorithm in which a pheromone parameter of the ant colony optimization algorithm is specified as an inverse of segment heat criticality measures computed for toolpath segments of candidate layer toolpaths. In applying an ant colony optimization algorithm (or any other path optimization algorithm 310), the toolpath reordering engine 110 may separately evaluate toolpath segments based on segment heat criticality measures, which may refer to any heat criticality measure specified on a per-toolpath segment basis. Example forms of segment toolpath heat criticality measures include averaging the point-wise criticalities over a toolpath segment (e.g., per hatch vector), defining an intervention threshold by a number of high-criticality points in a given toolpath segment with a build temperature that exceeds a critical temperature by a critical gradient threshold (e.g., by more than 10° C.), by defining the criticality of a toolpath segment by an average over the criticality measure of neighboring sample points, and more.

In general, the toolpath reordering engine 110 may apply an optimization flow iterating over candidate toolpaths through random distributions and measuring changes in pheromone parameter values to evaluate optimal paths. Any colony optimizations may be designed to identify "shortest" paths in a weighted graph via pheromone distribution, and in this case, a "shortest" path criteria may be specified according to build time and/or segment heat criticality measures. In particular, the toolpath reordering engine 110 may measure pheromone traces by the inverse of segment-wise (e.g., vector-wise) heat criticality measures. In testing different candidate layer toolpaths, "ants" progress through possible paths (in this case toolpath segments) as represented via a weighted graph. and in doing so deposit pheromones and weight edges accordingly.

With these pheromone parameter configurations, the toolpath reordering engine 110 may further configure another heuristic factor as the probability of the $k^{th}$ ant to follow a given toolpath segment or set of toolpath segments from point i to point j as the following:

$$P_{ij}^k = \frac{\tau_{ij}^\alpha \eta_{ij}^\beta}{\sum_{z \in N_i^k} \tau_{iz}^\alpha \eta_{iz}^\beta} \text{ if } j \in N_j^k$$

In this example, the toolpath reordering engine 110 may configure the parameter $\tau$ as the pheromone parameter, in this case the inverse of segment criticality measure (and thus heat measure criticality with reduced heat impact/gradience from critical temperatures act as a positive indicator and shift the ant colony path traversals towards lesser segment heat criticality measures).

The toolpath reordering engine 110 may configure the parameter $\eta$ as a heuristic to be solved/optimized by the path optimization algorithm 310, in this example an ant colony optimization algorithm. In particular examples, the toolpath reordering engine 110 may set $$\eta = \frac{1}{\text{traveling times}},$$

in which the toolpath reordering engine 110 may define such traveling times terms as the non-3D printing time required to traverse from the end of a given toolpath segment to the start of the subsequent toolpath segment in a traversed path (in effect, measuring non-3D printing traversal times of the 3D printer between the end and start of consecutive toolpath segments). As such, the toolpath reordering engine 110 may optimize the overall exposure time of a layer toolpath as $T=\Sigma_i t_i$ (with $t_i$ as the traveling time after the $i^{th}$ toolpath segment in the 3D print order of a given toolpath, which may depend on the distance between subsequent toolpath segments). As noted herein, the toolpath reordering engine 110 may optimize build time T with a constraint that the heat criticality measure of the layer toolpath (or included toolpath segments) satisfies algorithm constraints with regards to threshold heat criticality measures.

To explain further, the toolpath reordering engine 110 may set the exponents $\alpha$ and $\beta$ as weights for the pheromone parameter values and build time heuristic on ant traversal probabilities. For an initial iteration, the toolpath reordering engine 110 may use the heat criticality measure 340 of the original layer toolpath 330 to compute segment heat criticality measures, and then calculate the pheromone parameter values for each toolpath segment (as the inverse of the computed or accessed segment heat criticality measures), which may include pheromone parameter values from some or all possible transitions from one toolpath segments to another among the toolpath segments of the original layer toolpath 330.

From the computed pheromone parameter values, together with the heuristic values $\eta$, the toolpath reordering engine 110 may determine the probabilities of all allowed transitions between toolpath segments. In doing so, the toolpath reordering engine 110 may limit (e.g., exclude or otherwise restrict) transitions between toolpath segments by any physical, technical, or process-specific boundary conditions which apply to 3D printing process (e.g., part boundaries, etc.). In such a way, the toolpath reordering engine 110 may iterate across the weighted graph of an ant colony optimization algorithm, and determine an optimal 3D print order of toolpath segments accordingly. A determined optimal 3D print order may minimize the build time under the constraint of limiting the heat criticality measure of toolpath segments (e.g., all segment heat criticality measures are below a threshold value, the sum of segment heat criticality measures are below a threshold value, or any other configurable algorithm constraint). Then, the toolpath reordering engine 110 may recalculate the criticality for the determined candidate layer toolpath (and corresponding 3D printing order), which may allow toolpath reordering engine 110 to update the pheromone parameter values until the heat criticality measure is reduced as far as possible limiting the build time.

In such ways as described herein, the toolpath reordering engine 110 may iteratively optimize candidate layer toolpaths through a path optimization algorithm 310, and thus reorder the original layer toolpath 330 according to specified algorithm constraints (e.g., build time and heat criticality measures). The output of the path optimization algorithm 310 may include a reordered set of toolpath segments optimized for the algorithm constraints, which may thus form the modified layer toolpath 350.

In some implementations (e.g., as shown in the example in FIG. 3), the toolpath reordering engine 110 may separately apply a path optimization algorithm 310 for each original layer toolpath (and corresponding heat criticality measure) received as inputs. In other implementations, the toolpath reordering engine 110 need not separately apply optimization algorithm for each separate original layer toolpath to reorder, but may instead train machine-learning models to control toolpath segment reordering for received original layer toolpaths. Training and application of example machine-learning models for heat-aware toolpath reordering are described next with reference to FIGS. 4 and 5.

Figure 4:
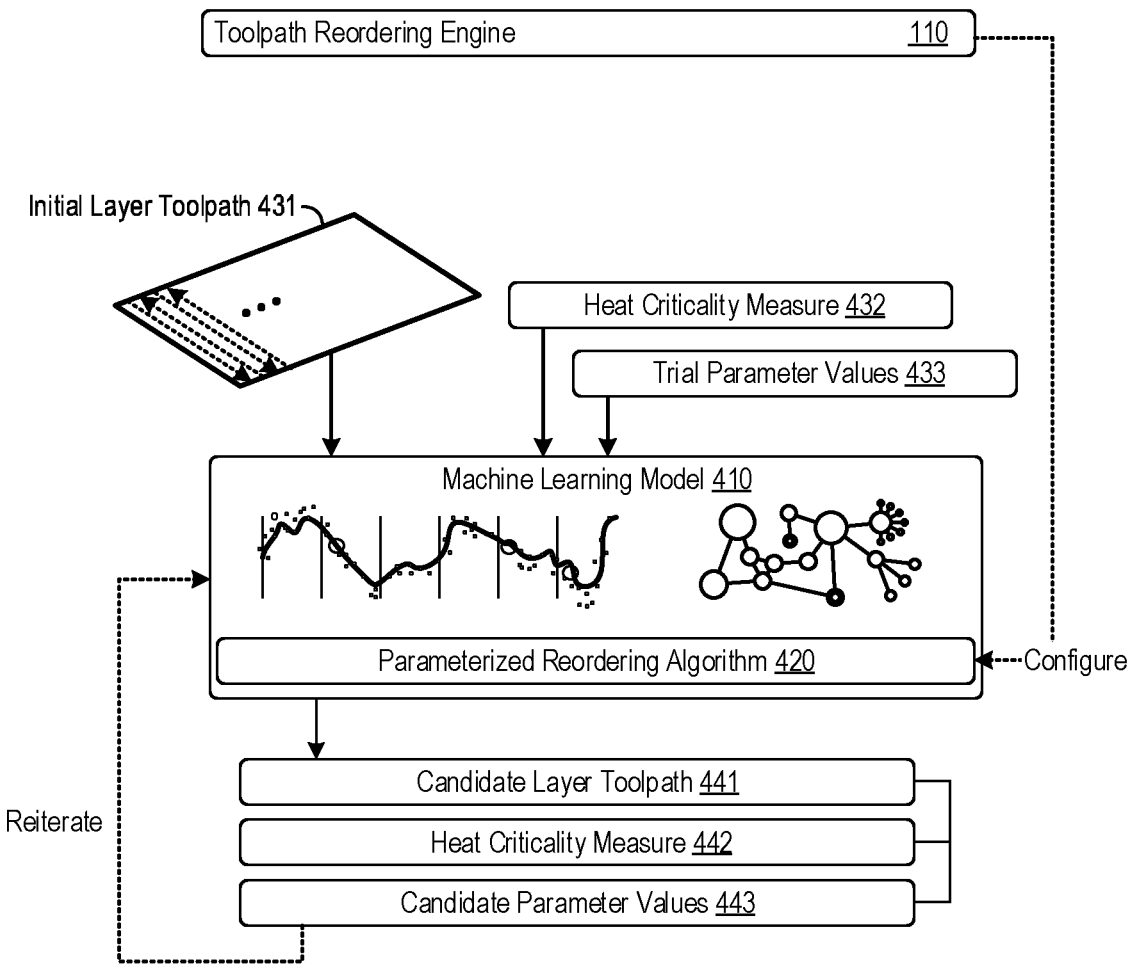
FIG. 4 shows an example training of a machine-learning model to support heat-aware toolpath reordering for 3D printing of physical parts.

FIG. 4 shows an example training of a machine-learning model to support heat-aware toolpath reordering for 3D printing of physical parts. In FIG. 4, the toolpath reordering engine 110 may implement or otherwise access a machine-learning model 410, which may be trained according any combination of machine-learning techniques, processes, or algorithms. The machine-learning model 410 may implement or provide any number of machine learning techniques to analyze, and interpret toolpaths used for 3D printing. For instance, the machine-learning model 410 may implement any number of supervised, semi-supervised, unsupervised, or reinforced learning models to interpret original layer toolpaths and/or corresponding heat criticality measures. The machine-learning model 410 may include Markov chains, context trees, support vector machines, neural networks, Bayesian networks, or various other machine learning components. In some instances, the machine-learning model 410 may apply any number of reinforced learning techniques for model training to support the heat-aware toolpath reordering features described herein.

The toolpath reordering engine 110 may train the machine-learning model 410 by configuring a parameterized reordering algorithm 420 that accounts for multiple parameters in 3D printing of physical parts. The parameterized reordering algorithm 420 may take the form of any function, technique, heat-aware criteria, or other logic that can be applied to reorder the toolpath segments of an input layer toolpath (e.g., an original layer toolpath conventionally generated from a slice of a 3D CAD object). The parameterized reordering algorithm 420 may, in some implementations, also take, as an input, a heat criticality measure for the input layer toolpath as well. Examples of parameterized reordering algorithms include logic that specifies reordering criteria for toolpath segment, e.g., a rule-based toolpath interleaving scheme that reorders an input layer toolpath reordering to alternate by every three (3) toolpath segments in the original 3D printing order, distance-based toolpath segment reordering schemes, random distributions, and the like.

The toolpath reordering engine 110 may configure the parameterized reordering algorithm 420 to include any number parameters that can be used to control the reordering of toolpath segments in an input layer toolpath. Some examples of parameterizable attributes of the parameterized reordering algorithm 420 include toolpath segment lengths (e.g. hatch vector lengths), segment heat criticality measures, point-wise heat criticality measures, areas of interest or hotspots in a layer or layer toolpath (e.g., as identified via the heat criticality measure of an input toolpath), 3D printing process parameters (e.g., deposition tools, LBPF parameters), 3D printing material characteristics, any geometric and boundary constraints that limit the physical printing or ordering of toolpath segments, restrictions in jump or interleaving directions, and more. Any aspect of the 3D printing process of a physical part that can be objectively measured may be parameterizable by the toolpath reordering engine 110 as a component of the parameterized reordering algorithm 420.

To train the machine-learning model 410 based on the parameterized reordering algorithm 420, the toolpath reordering engine 110 may provide, as inputs to the training, trial parameter values for the multiple parameters of the parameterized reordering algorithm 420. The toolpath reordering engine 110 may determine the trial parameters randomly, based on actual prior 3D printing configurations, as predefined set of parameter values configured through user input, or in various other ways. As an input to the training, the toolpath reordering engine 110 may further receive an initial layer toolpath with a corresponding heat criticality measure computed for the initial layer toolpath. In the example of FIG. 4, the toolpath reordering engine 110 provides the initial layer toolpath 431, heat criticality measure 432 for the initial layer toolpath 431, and trial parameter values 433 as an input for training the machine-learning model 410.

Through the training, the toolpath reordering engine 110 (e.g., via the machine-learning model 410) may iterate over candidate layer toolpaths with corresponding heat criticality measures to optimize the parameterized reordering algorithm 420 based on the heat criticality measure and overall build time of the candidate layer toolpaths. Optimization may occur through adjusting of parameter values of the parameterized reordering algorithm 420 and evaluating a correspondingly generated candidate layer toolpath through the heat criticality measure of the candidate layer toolpath of the current iteration of the training. In a given iteration, the machine-learning model 410 may generate a candidate layer toolpath 441 as well as compute or otherwise access a heat criticality measure 442 for the candidate layer toolpath 441. The toolpath reordering engine 110 may implement any of the heat criticality measure computation or determination capabilities as described herein.

The candidate layer toolpath 441 may be generated by the machine-learning model 410 using a set of candidate parameter values 443 applied, determined, or otherwise adjusted for the given iteration via the machine-learning model 410 (e.g., via reinforced learning techniques). Through a toolpath evaluation of the candidate layer toolpath 441 through the corresponding heat criticality measure 442, the machine-learning model 410 may continue to iterate, learn, process, and determine adjusted parameter values to converge towards any number of configured objectives or constraints, as measured and evaluated through heat criticality measures, for instance. Collecting input data and input features as well as the resulting reordering of the toolpath segments for each iteration may allow the machine-learning model 410 to find an appropriate reordering policy (e.g., expressed as parameter values for the parameterized reordering algorithm 420) for the reordering of toolpath segments.

In some implementations, the toolpath reordering engine 110 may configure the machine-learning model 410 to optimize the parameter values of the parameterized reordering algorithm 420 according to objective measures, which way be specified as an objective function evaluated through overall build time of candidate layer toolpaths and/or heat criticality measure thresholds. Any of the various build time and heat criticality measure constraints described herein may be likewise applied for optimizing the parameter values of the parameterized reordering algorithm 420 via the machine-learning model 410. For instance, the machine-learning model 410 learn parameter values for the parameterized reordering algorithm 420 that may minimize overall build time of reordered toolpath segments that keeping the heat criticality measure of the reordered layer toolpath below a threshold value (whether measured as an aggregate, a max segment or point-wise heat criticality measure, or according to any other configurable evaluation criteria as described herein).

The output of the machine-learning model training may be a set of optimized parameter values for the parameterized reordering algorithm 420 (or in some examples, multiple sets based on varying parameter values for the 3D printing via an input layer toolpath). As such, the toolpath reordering engine 110 may obtain, from the iterating and model training, a trained model (e.g., the machine-learning model 410 after training) that designates learned parameter values for the multiple parameters of the parameterized reordering algorithm 420 that can be applied for input layer toolpaths. After training, the toolpath reordering engine 110 may use the trained machine-learning model to reorder toolpath segments for input layer toolpaths, as described next with reference to FIG. 5.

Figure 5:
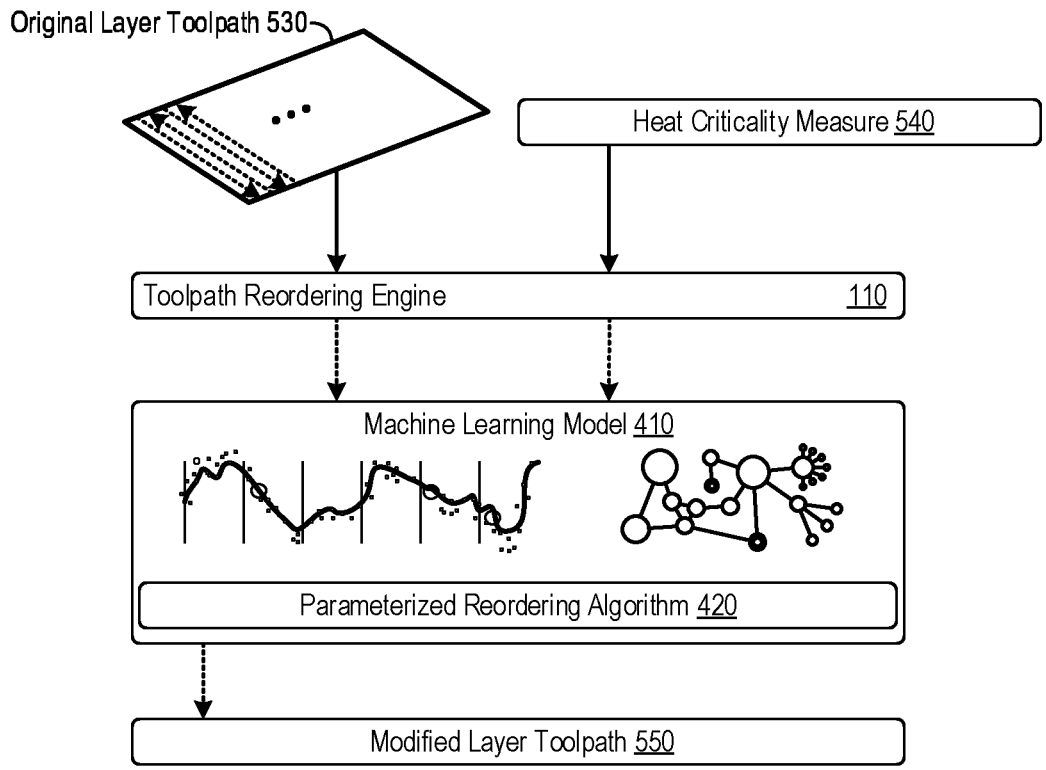
FIG. 5 shows an example application of a machine-learning model to support heat-aware toolpath reordering for 3D printing of physical parts.

FIG. 5 shows an example application of a machine-learning model to support heat-aware toolpath reordering for 3D printing of physical parts. In the example of FIG. 5, the toolpath reordering engine 110 may use a machine-learning model 410 trained with input data for a parameterized reordering algorithm 420 as described in FIG. 4.

In applying a trained machine-learning model, the toolpath reordering engine 110 may provide, as inputs to the machine-learning model 410, an original layer toolpath 530 and a heat criticality measure 540 determined for the original layer toolpath 530. The machine-learning model 410 may determine an appropriate reordering policy for the original layer toolpath 530 (further taking into account the heat criticality measure 540), as learned via training from input data. Accordingly, machine-learning model 410 may set learned parameter values for the parameterized reordering algorithm 420, apply the parameterized reordering algorithm 420 to the original layer toolpath 430, and obtain a modified layer toolpath 550 as an output of the machine-learning model 410.

Through prior training of the machine-learning model 410, the toolpath reordering engine 110 need not solve an optimization problem for every single input layer toolpath, instead relying upon the trained machine-learning model 410 to optimize the reordering of toolpath segments of input layer toolpaths. As such, the ML-training and application features described herein may improve the efficiency of heat-aware toolpath reordering.

While many heat-aware toolpath reordering features have been described herein through illustrative examples presented through various figures, the access engine 108 and the toolpath reordering engine 110 may implement any combination of the heat-aware toolpath reordering features described herein.

Figure 6:
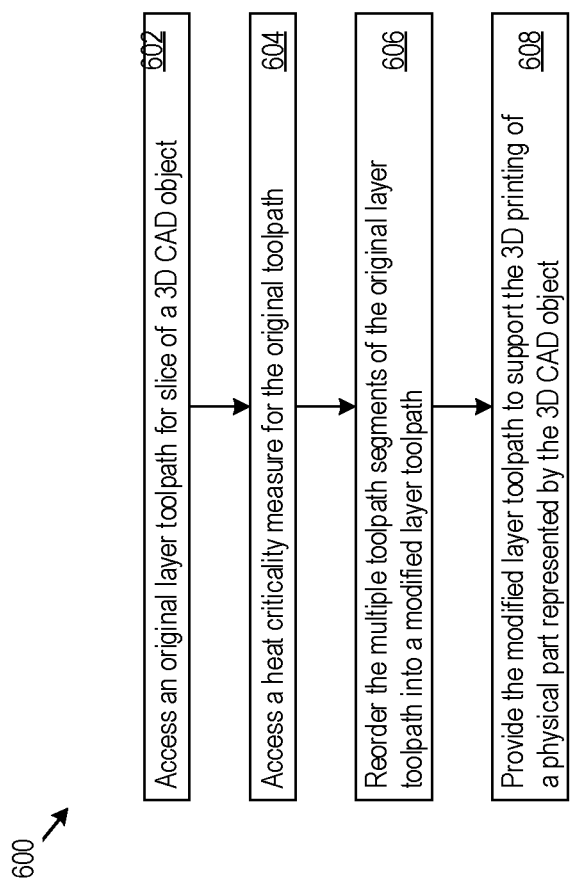
FIG. 6 shows an example of logic that a system may implement to support heat-aware toolpath reordering for 3D printing of physical parts.

FIG. 6 shows an example of logic 600 that a system may implement to support heat-aware toolpath reordering for 3D printing of physical parts. For example, the computing system 100 may implement the logic 600 as hardware, executable instructions stored on a machine-readable medium, or as a combination of both. The computing system 100 may implement the logic 600 via the access engine 108 and the toolpath reordering engine 110, through which the computing system 100 may perform or execute the logic 600 as a method to support heat-aware toolpath reordering for 3D printing of physical parts. The following description of the logic 600 is provided using the access engine 108 and the toolpath reordering engine 110 as examples. However, various other implementation options by systems are possible.

In implementing the logic 600, the access engine 108 may access an original layer toolpath for slice of a 3D CAD object (602). The 3D CAD object may represent a physical part, the slice may represent a physical layer for 3D printing of the physical part, and the original layer toolpath may control the 3D printing of the physical layer and include a 3D print order for multiple toolpath segments of the original layer toolpath. In implementing the logic 600, the access engine 108 may also access a heat criticality measure for the original layer toolpath (604). The heat criticality measure may specify a heat impact for different points on the multiple toolpath segments of the original layer toolpath for the 3D printing of the physical part using the original layer toolpath.

In implementing the logic 600, the toolpath reordering engine 110 may reorder the multiple toolpath segments of the original layer toolpath into a modified layer toolpath (606), doing so in any of the ways described herein. The modified layer toolpath may have a different 3D print order from the original layer toolpath and a heat criticality measure with a lesser heat impact on the physical part than the heat criticality measure for the original layer toolpath. In implementing the logic 600, the toolpath reordering engine 110 may further provide the modified layer toolpath to support the 3D printing of the physical part represented by the 3D CAD object (608).

The logic 600 shown in FIG. 6 provides an illustrative example by which a computing system 100 may support heat-aware toolpath reordering for 3D printing of physical parts. Additional or alternative steps in the logic 600 are contemplated herein, including according to any of the various features described herein for the access engine 108, the toolpath reordering engine 110, or any combinations thereof.

Figure 7:
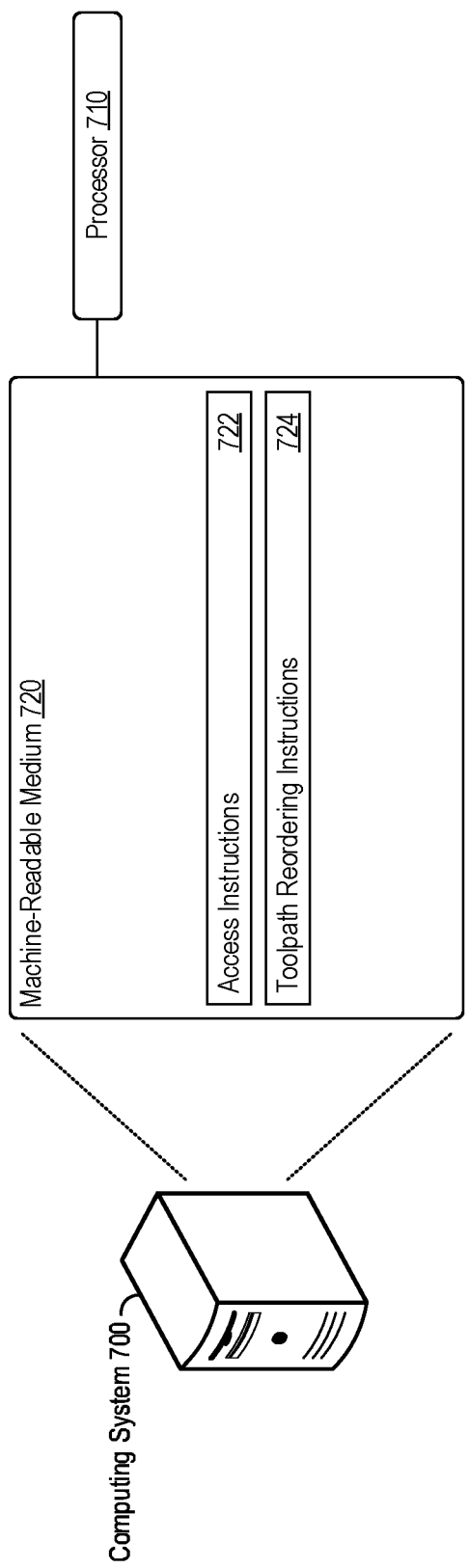
FIG. 7 shows an example of a computing system that supports heat-aware toolpath reordering for 3D printing of physical parts.

FIG. 7 shows an example of a computing system 700 that supports heat-aware toolpath reordering for 3D printing of physical parts. The computing system 700 may include a processor 710, which may take the form of a single or multiple processors. The processor(s) 710 may include a central processing unit (CPU), microprocessor, or any hardware device suitable for executing instructions stored on a machine-readable medium. The system 700 may include a machine-readable medium 720. The machine-readable medium 720 may take the form of any non-transitory electronic, magnetic, optical, or other physical storage device that stores executable instructions, such as the access instructions 722 and the toolpath reordering instructions 724 shown in FIG. 7. As such, the machine-readable medium 720 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 700 may execute instructions stored on the machine-readable medium 720 through the processor 710. Executing the instructions (e.g., the access instructions 722 and/or the toolpath reordering instructions 724) may cause the computing system 700 to perform any of the heat-aware toolpath reordering features described herein, including according to any of the features of the access engine 108, the toolpath reordering engine 110, or combinations of both.

For example, execution of the access instructions 722 by the processor 710 may cause the computing system 700 to access an original layer toolpath for slice of a 3D CAD object and access a heat criticality measure for the original layer toolpath. The 3D CAD object may represent a physical part, the slice may represent a physical layer for 3D printing of the physical part, and the original layer toolpath may control the 3D printing of the physical layer and include a 3D print order for multiple toolpath segments of the original layer toolpath. The heat criticality measure for the original layer toolpath may specify a heat impact for different points on the multiple toolpath segments of the original layer toolpath for the 3D printing of the physical part using the original layer toolpath.

Execution of the toolpath reordering instructions 724 by the processor 710 may cause the computing system 700 to reorder the multiple toolpath segments of the original layer toolpath into a modified layer toolpath, doing so in any of the ways described herein. The modified layer toolpath may have a different 3D print order from the original layer toolpath and a heat criticality measure with a lesser heat impact on the physical part than the heat criticality measure for the original layer toolpath. Execution of the toolpath reordering instructions 724 by the processor 710 may further cause the computing system 700 to provide the modified layer toolpath to support the 3D printing of the physical part.

Any additional or alternative heat-aware toolpath reordering features as described herein may be implemented via the access instructions 722, toolpath reordering instructions 724, or a combination of both.

The systems, methods, devices, and logic described above, including the access engine 108 and the toolpath reordering engine 110, may be implemented in many different ways in many different combinations of hardware, logic, circuitry, and executable instructions stored on a machine-readable medium. For example, the access engine 108, the toolpath reordering engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the access engine 108, the toolpath reordering engine 110, or combinations thereof.

The processing capability of the systems, devices, and engines described herein, including the access engine 108 and the toolpath reordering engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
by a computing system:
accessing an original layer toolpath for slice of a 3D CAD object, wherein the 3D CAD object represents a physical part, wherein the slice represents a physical layer for 3D printing of the physical part, and wherein the original layer toolpath controls the 3D printing of the physical layer and comprises a 3D print order for multiple toolpath segments for the original layer toolpath;
accessing a heat criticality measure for the original layer toolpath, wherein the heat criticality measure for the original layer toolpath specifies a heat impact for different points on the multiple toolpath segments of the original layer toolpath for the 3D printing of the physical part using the 3D print order of original layer toolpath;
reordering the multiple toolpath segments into a modified layer toolpath, wherein the modified layer toolpath has a different 3D print order from the original layer toolpath and has a heat criticality measure with a lesser heat impact on the physical part than the heat criticality measure for the original layer toolpath; and
providing the modified layer toolpath to support the 3D printing of the physical part.

2. The method of claim 1, wherein the heat criticality measure for the original layer toolpath specifies a degree to which temperatures of the 3D part for each of the different points on the multiple toolpath segments exceed a critical temperature for the 3D printing of the physical part.

3. The method of claim 1, wherein reordering the multiple toolpath segments into the modified layer toolpath comprises iteratively optimizing candidate layer toolpaths using a path optimization algorithm applied to optimize the heat criticality measure and overall build time of the candidate layer toolpaths in order to determine the modified layer toolpath.

4. The method of claim 3, wherein iteratively optimizing the candidate layer toolpaths comprises, for a given iteration of the path optimization algorithm:
accessing, as a candidate layer toolpath, an output layer toolpath determined from a prior iteration of the path optimization algorithm, wherein the candidate layer toolpath comprises multiple toolpath segments;
accessing a segment heat criticality measure for each of multiple toolpath segments of the candidate layer toolpath;
applying, as the path optimization algorithm, an ant colony optimization algorithm in which a pheromone parameter of the ant colony optimization algorithm is specified as an inverse of the segment heat criticality measures; and
determining, from the ant colony optimization algorithm, an output layer toolpath of a current iteration of the path optimization algorithm.

5. The method of claim 4, wherein the original layer toolpath is the candidate layer toolpath for an initial iteration of the path optimization algorithm.

6. The method of claim 1- or 2, further comprising training a machine-learning model to determine the modified layer toolpath, including by:
configuring a parameterized reordering algorithm that accounts for multiple parameters in 3D printing of physical parts;
providing, as inputs to the training, trial parameter values for the multiple parameters and an initial layer toolpath with a corresponding heat criticality measure;
iterating, through the training, over candidate layer toolpaths with corresponding heat criticality measures to optimize the parameterized reordering algorithm based on the heat criticality measure and overall build time of the candidate layer toolpaths; and
obtaining, from the iterating, the machine-learning model that designates learned parameter values for the multiple parameters.

7. The method of claim 6, wherein reordering the multiple toolpath segments into the modified layer toolpath comprises:
providing, as inputs to the machine-learning model, the original layer toolpath and the heat criticality measure for the original layer toolpath; and
obtaining the modified layer toolpath as an output of the machine-learning model.

8. A system comprising:
an access engine configured to:
access an original layer toolpath for slice of a 3D CAD object, wherein the 3D CAD object represents a physical part, wherein the slice represents a physical layer for 3D printing of the physical part, and wherein the original layer toolpath controls the 3D printing of the physical layer and comprises a 3D print order for multiple toolpath segments of the original layer toolpath; and
access a heat criticality measure for the original layer toolpath, wherein the heat criticality measure specifies a heat impact for different points on the multiple toolpath segments of the original layer toolpath for the 3D printing of the physical part using the original layer toolpath; and
a toolpath reordering engine configured to:
reorder the multiple toolpath segments into a modified layer toolpath, wherein the modified layer toolpath has a different 3D print order from the original layer toolpath and a heat criticality measure with a lesser heat impact on the physical part than the heat criticality measure for the original layer toolpath; and
provide the modified layer toolpath to support the 3D printing of the physical part.

9. The system of claim 8, wherein the heat criticality measure for the original layer toolpath specifies a degree to which temperatures of the 3D part for each of the different points on the multiple toolpath segments exceed a critical temperature for the 3D printing of the physical part.

10. The system of claim 8, wherein the toolpath reordering engine is configured to reorder the multiple toolpath segments into the modified layer toolpath by iteratively optimizing candidate layer toolpaths using a path optimization algorithm applied to optimize the heat criticality measure and overall build time of the candidate layer toolpaths in order to determine the modified layer toolpath.

11. The system of claim 10, wherein the toolpath reordering engine is configured to iteratively optimize the candidate layer toolpaths, including by, for a given iteration of the path optimization algorithm:
    accessing, as a candidate layer toolpath, an output layer toolpath determined from a prior iteration of the path optimization algorithm, wherein the candidate layer toolpath comprises multiple toolpath segments;
    accessing a segment heat criticality measure for each of multiple toolpath segments of the candidate layer toolpath;
    applying, as the path optimization algorithm, an ant colony optimization algorithm in which a pheromone parameter of the ant colony optimization algorithm is specified as an inverse of the segment heat criticality measures; and
    determining, from the ant colony optimization algorithm, an output layer toolpath of a current iteration of the path optimization algorithm.

12. The system of claim 11, wherein the toolpath reordering engine is configured to identify the original layer toolpath as the candidate layer toolpath for an initial iteration of the path optimization algorithm.

13. The system of claim 8, wherein the toolpath reordering engine is further configured to train a machine learning model to determine the modified layer toolpath, including by:
    configuring a parameterized reordering algorithm that accounts for multiple parameters in 3D printing of physical parts;
    providing, as inputs to the training, trial parameter values for the multiple parameters and an initial layer toolpath with a corresponding heat criticality measure;
    iterating, through the training, over candidate layer toolpaths with corresponding heat criticality measures to optimize the parameterized reordering algorithm based on the heat criticality measure and overall build time of the candidate layer toolpaths; and
    obtaining, from the iterating, the machine-learning model that designates learned parameter values for the multiple parameters.

14. The system of claim 13, wherein the toolpath reordering engine is configured to reorder the multiple toolpath segments into the modified layer toolpath by:
    providing, as inputs to the machine-learning model, the original layer toolpath and the heat criticality measure for the original layer toolpath; and
    obtaining the modified layer toolpath as an output of the machine-learning model.

15. A non-transitory machine-readable medium comprising instructions that, when executed by a processor, cause a computing system to:
    access an original layer toolpath for slice of a 3D CAD object, wherein the 3D CAD object represents a physical part, wherein the slice represents a physical layer for 3D printing of the physical part, and wherein the original layer toolpath controls the 3D printing of the physical layer and comprises a 3D print order for multiple toolpath segments for the original layer toolpath;
    access a heat criticality measure for the original layer toolpath, wherein the heat criticality measure for the original layer toolpath specifies a heat impact for different points on the multiple toolpath segments of the original layer toolpath for the 3D printing of the physical part using the 3D print order of original layer toolpath;
    reorder the multiple toolpath segments into a modified layer toolpath, wherein the modified layer toolpath has a different 3D print order from the original layer toolpath and has a heat criticality measure with a lesser heat impact on the physical part than the heat criticality measure for the original layer toolpath; and
    provide the modified layer toolpath to support the 3D printing of the physical part.

16. The non-transitory machine-readable medium of claim 15, wherein the instructions cause the computing system to reorder the multiple toolpath segments into the modified layer toolpath by iteratively optimizing candidate layer toolpaths using a path optimization algorithm applied to optimize the heat criticality measure and overall build time of the candidate layer toolpaths in order to determine the modified layer toolpath.

17. The non-transitory machine-readable medium of claim 16, wherein the instructions cause the computing system to iteratively optimize the candidate layer toolpaths, including by, for a given iteration of the path optimization algorithm:
    accessing, as a candidate layer toolpath, an output layer toolpath determined from a prior iteration of the path optimization algorithm, wherein the candidate layer toolpath comprises multiple toolpath segments;
    accessing a segment heat criticality measure for each of multiple toolpath segments of the candidate layer toolpath;
    applying, as the path optimization algorithm, an ant colony optimization algorithm in which a pheromone parameter of the ant colony optimization algorithm is specified as an inverse of the segment heat criticality measures; and
    determining, from the ant colony optimization algorithm, an output layer toolpath of a current iteration of the path optimization algorithm.

18. The non-transitory machine-readable medium of claim 17, wherein the instructions cause the computing system to identify the original layer toolpath as the candidate layer toolpath for an initial iteration of the path optimization algorithm.

19. The non-transitory machine-readable medium of claim 15, wherein the instructions further cause the computing system to train a machine learning model to determine the modified layer toolpath, including by:
    configuring a parameterized reordering algorithm that accounts for multiple parameters in 3D printing of physical parts;
    providing, as inputs to the training, trial parameter values for the multiple parameters and an initial layer toolpath with a corresponding heat criticality measure;
    iterating, through the training, over candidate layer toolpaths with corresponding heat criticality measures to optimize the parameterized reordering algorithm based on the heat criticality measure and overall build time of the candidate layer toolpaths; and obtaining, from the iterating, the machine-learning model that designates learned parameter values for the multiple parameters.

20. The non-transitory machine-readable medium of claim 15, wherein the instructions cause the computing system to reorder the multiple toolpath segments into the modified layer toolpath by:

providing, as inputs to a machine-learning model, the original layer toolpath and the heat criticality measure for the original layer toolpath; and obtaining the modified layer toolpath as an output of the machine-learning model.

* * * * *